(12) United States Patent
Hacker et al.

(10) Patent No.: US 6,322,697 B1
(45) Date of Patent: Nov. 27, 2001

(54) OIL FILTER ASSEMBLY

(75) Inventors: John R. Hacker, Edina; Michael Jon Gustafson, Inver Grove Heights, both of MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 09/357,009

(22) Filed: Jul. 19, 1999

(51) Int. Cl.$^7$ ................................................ B01D 27/14
(52) U.S. Cl. .................. 210/248; 210/316; 210/315; 210/342; 210/323.2; 210/444; 210/450
(58) Field of Search .................................. 210/315, 316, 210/342, 248, 323.2, 443, 444, 456, 450, DIG. 13

(56) References Cited

U.S. PATENT DOCUMENTS

| | | |
|---|---|---|
| 2,387,368 | * 10/1945 | Vokes . |
| 3,000,506 | 9/1961 | Hultgren . |
| 3,054,507 | 9/1962 | Humbert, Jr. et al. . |
| 3,224,583 | 12/1965 | Rosaen . |
| 3,288,290 | * 11/1966 | Rosaen . |
| 3,288,291 | * 11/1966 | Rosaen . |
| 3,353,680 | * 11/1967 | Niebergall . |
| 3,370,708 | * 2/1968 | Hultgren et al. . |
| 3,396,103 | 8/1968 | Huntington . |
| 3,397,786 | 8/1968 | Hultgren . |
| 3,561,604 | 2/1971 | Yotsumoto . |
| 3,591,010 | 7/1971 | Pall . |
| 3,708,965 | 1/1973 | Domnick . |
| 4,081,379 | 3/1978 | Smith . |
| 4,108,775 | 8/1978 | Wilkes et al. . |
| 4,124,360 | 11/1978 | Berger, Jr. et al. . |
| 4,133,763 | 1/1979 | Cooper . |
| 4,271,025 | 6/1981 | Erdmannsdörfer . |
| 4,334,994 | 6/1982 | Jensen . |
| 4,350,509 | 9/1982 | Alseth et al. . |
| 4,632,682 | 12/1986 | Erdmannsdörfer . |
| 4,806,242 | 2/1989 | Jackson . |
| 4,816,162 | 3/1989 | Rosskopf et al. . |

(List continued on next page.)

FOREIGN PATENT DOCUMENTS

| | | |
|---|---|---|
| 87 07 478 U1 | 7/1987 | (DE) . |
| 44 39 815 A1 | 5/1996 | (DE) . |
| 195 38 883 A1 | 4/1997 | (DE) . |
| 196 18 166 A1 | 11/1997 | (DE) . |
| 1.177.350 | 4/1959 | (FR) . |
| 2 061 123 A | 5/1981 | (GB) . |
| 2 226 254 A | 6/1990 | (GB) . |
| WO 94/19086 | 9/1994 | (WO) . |
| WO 96/30104 | 10/1996 | (WO) . |
| WO 00/24494 | 5/2000 | (WO) . |

OTHER PUBLICATIONS

"RFM . . . SET", *HYDAC Technology Corporation*, 6 pgs. (©1999).

*Primary Examiner*—John Kim
*Assistant Examiner*—David Sorkin
(74) *Attorney, Agent, or Firm*—Merchant & Gould P.C.

(57) ABSTRACT

The present disclosure relates to a filter assembly including an outer housing, and a removable filter insert that fits within the housing. The filter insert includes a generally cylindrical filter element. An insert body is connected to the filter element. The insert body includes a top end cap in which a top end of the filter element is potted, and a bottom end cap in which a bottom end of the filter element is potted. The insert body also includes a cylindrical liner or wall that surrounds the filter element. The cylindrical liner is spaced-apart from the filter element such that an annular flow passageway is defined between the cylindrical liner and the filter element. The outer wall is configured to prevent contaminants from escaping from the filter insert and contaminating the inside of the housing.

14 Claims, 14 Drawing Sheets

U.S. PATENT DOCUMENTS

| | | |
|---|---|---|
| 4,892,667 | 1/1990 | Parker, III et al. . |
| 4,909,937 | 3/1990 | Hoffman et al. . |
| 4,963,258 | 10/1990 | Yagishita . |
| 5,013,434 * | 5/1991 | Furrow . |
| 5,085,769 | 2/1992 | Klausen et al. . |
| 5,104,532 | 4/1992 | Thompson et al. . |
| 5,152,890 | 10/1992 | Linnersten . |
| 5,180,489 | 1/1993 | Bourgeois . |
| 5,190,651 | 3/1993 | Spencer et al. . |
| 5,342,511 | 8/1994 | Brown et al. . |
| 5,520,801 | 5/1996 | Gerber et al. . |
| 5,587,066 | 12/1996 | Covington . |
| 5,593,578 | 1/1997 | Bryan et al. . |
| 5,660,729 | 8/1997 | Baumann . |
| 5,670,042 | 9/1997 | Clausen et al. . |
| 5,685,985 | 11/1997 | Brown et al. . |
| 5,695,636 | 12/1997 | Gullett . |
| 5,702,602 | 12/1997 | Brown et al. . |
| 5,711,872 | 1/1998 | Jones et al. . |
| 5,718,825 | 2/1998 | Greive et al. . |
| 5,772,881 | 6/1998 | Stockhowe et al. . |
| 5,800,584 | 9/1998 | Hinderer et al. . |
| 5,811,002 | 9/1998 | Felber . |
| 5,846,416 | 12/1998 | Gullett . |
| 5,846,417 | 12/1998 | Jiang et al. . |
| 5,868,932 | 2/1999 | Guichaoua et al. . |
| 5,876,600 | 3/1999 | Matsubara et al. . |
| 5,906,736 | 5/1999 | Bounnakhom et al. . |
| 5,984,109 | 11/1999 | Kanwar et al. |

* cited by examiner .

OIL FILTER ASSEMBLY

FIELD OF THE INVENTION

The present invention relates generally to filters. More particularly, the present invention relates to liquid filters (e.g., hydraulic fluid filters, engine oil filters or fuel filters) having replaceable filter elements.

BACKGROUND OF THE INVENTION

Although applicable to a number of fields, the present invention relates primarily to hydraulic oil filters. Filters have long been used in hydraulic systems to remove contaminants from hydraulic oil. It is well known that, with time, hydraulic oil filters become plugged or clogged with contaminants and are required to be replaced.

A typical hydraulic filter assembly includes a housing (e.g., a bowl or canister) containing a cylindrical filter element. The cylindrical filter element typically defines a central longitudinal opening in which a central core is mounted. The core provides support for preventing the filter element from collapsing inward. In use, oil is directed from a hydraulic system into an annular channel defined between the housing and the outer surface of the filter element. Pressure from the hydraulic system forces the hydraulic oil from the annular flow passage, through the filter element, and into the central opening of the filter element. From the central opening of the filter element, the filtered hydraulic oil is discharged from the filter assembly.

Disposable or "throw-away" type fluid filters are well known in the art. In this type of filter assembly, the filter element is permanently sealed within the housing. When the filter element becomes clogged with contaminants, the entire filter assembly is discarded and replaced with a new unit.

Oil filter assemblies having replaceable filter elements are also known in the art. Filter assemblies with replaceable filter elements are desirable because the housing can be reused thereby reducing the amount of waste that enters the waste stream. Consequently, as landfill costs increase, filter assemblies having replaceable filter elements will become increasingly more desirable.

Contamination is an important consideration relating to filter assemblies having replaceable filter elements. For example, prior art systems having replaceable filter elements can experience the accumulation of contaminants within the reusable housings that cover the replaceable filter elements. If this occurs, the "clean" side of new filter elements inserted within the contaminated housings can immediately become contaminated. There is a need in the art to prevent this type of contamination from occurring.

SUMMARY OF THE INVENTION

One aspect of the present invention relates to a filter insert adapted to be removably mounted within a filter housing. The filter insert includes a first filter element aligned along a longitudinal axis that extends between top and bottom ends of the first filter element. The first filter element includes an inner side that faces toward the longitudinal axis and defines a central opening that extends along the longitudinal axis. The first filter element also includes an outer side that faces away from the longitudinal axis. The filter insert also includes an insert body connected to the first filter element. The insert body includes a top end cap in which the top end of the first filter element is sealed and secured; a bottom end cap in which the bottom end of the first filter element is sealed and secured; and an outer wall that surrounds the first filter element. The outer wall is spaced-apart from the outer side of the first filter element such that a contaminant containment chamber is defined between the outer wall and the first filter element. The filter insert further includes a second filter element positioned outside the first filter element for filtering liquid that drains from the contaminant containment chamber.

Another aspect of the present invention relates to a filter insert adapted to be mounted within a filter housing. The filter insert includes structure for preventing contaminants from accumulating within the filter housing. The filter insert also includes structure for ensuring that contaminants located on the dirty side of the filter insert are carried along with the filter insert when the filter insert is removed from the housing.

A variety of advantages of the invention will be set forth in part in the description that follows, and in part will be apparent from the description, or may be learned by practicing the invention. It is to be understood that both the foregoing general description and the following detailed description are illustrative and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to preferred embodiments of the present invention that are illustrated in the accompanying drawings. Wherever possible, the same reference numbers will be used throughout the drawings to refer to the same or like parts.

Figure 1:
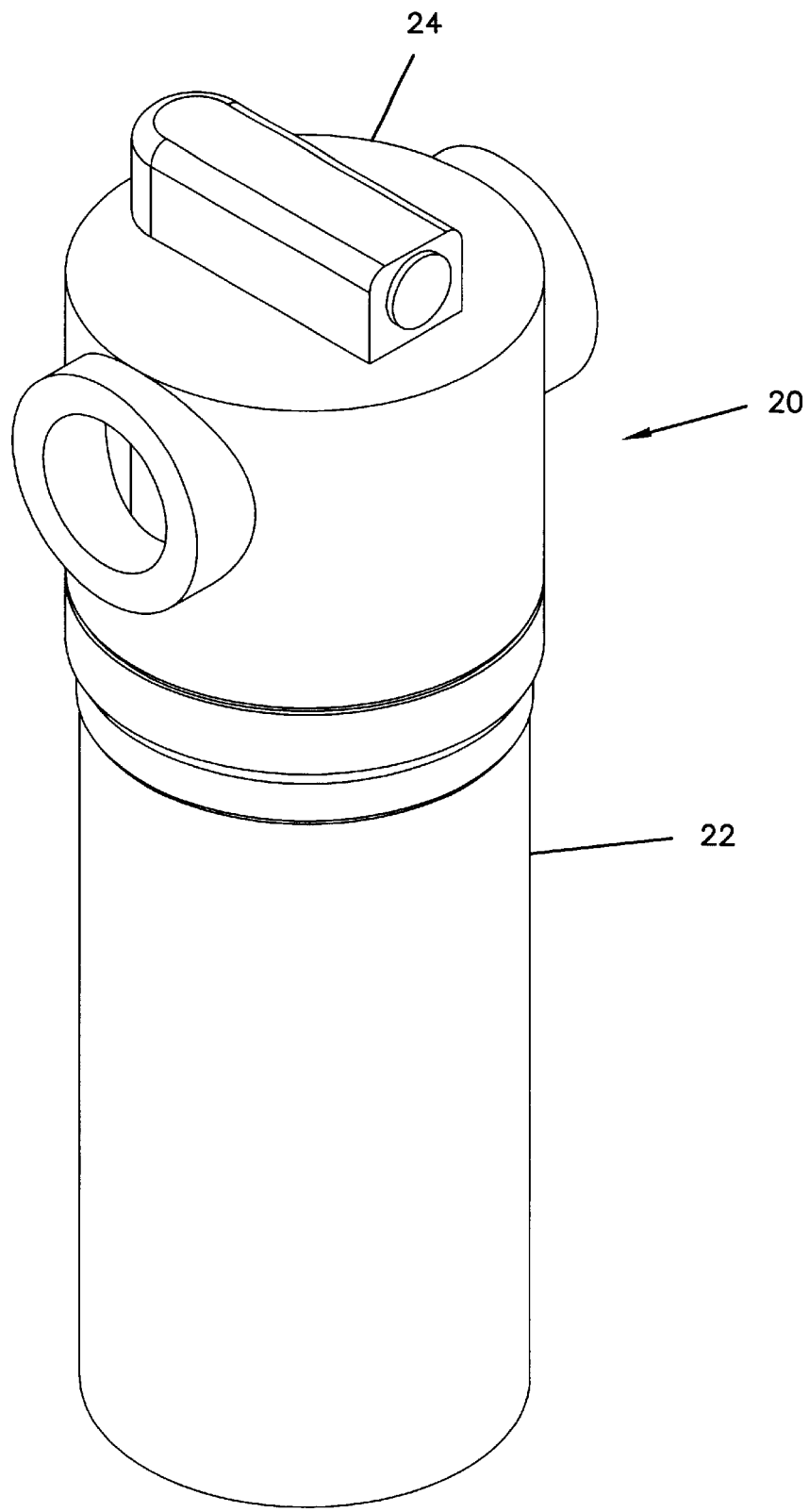
FIG. 1 is a perspective view of a filter assembly constructed in accordance with the principles of the present invention, the filter assembly is shown connected to a conventional filter head.
Figure 2:
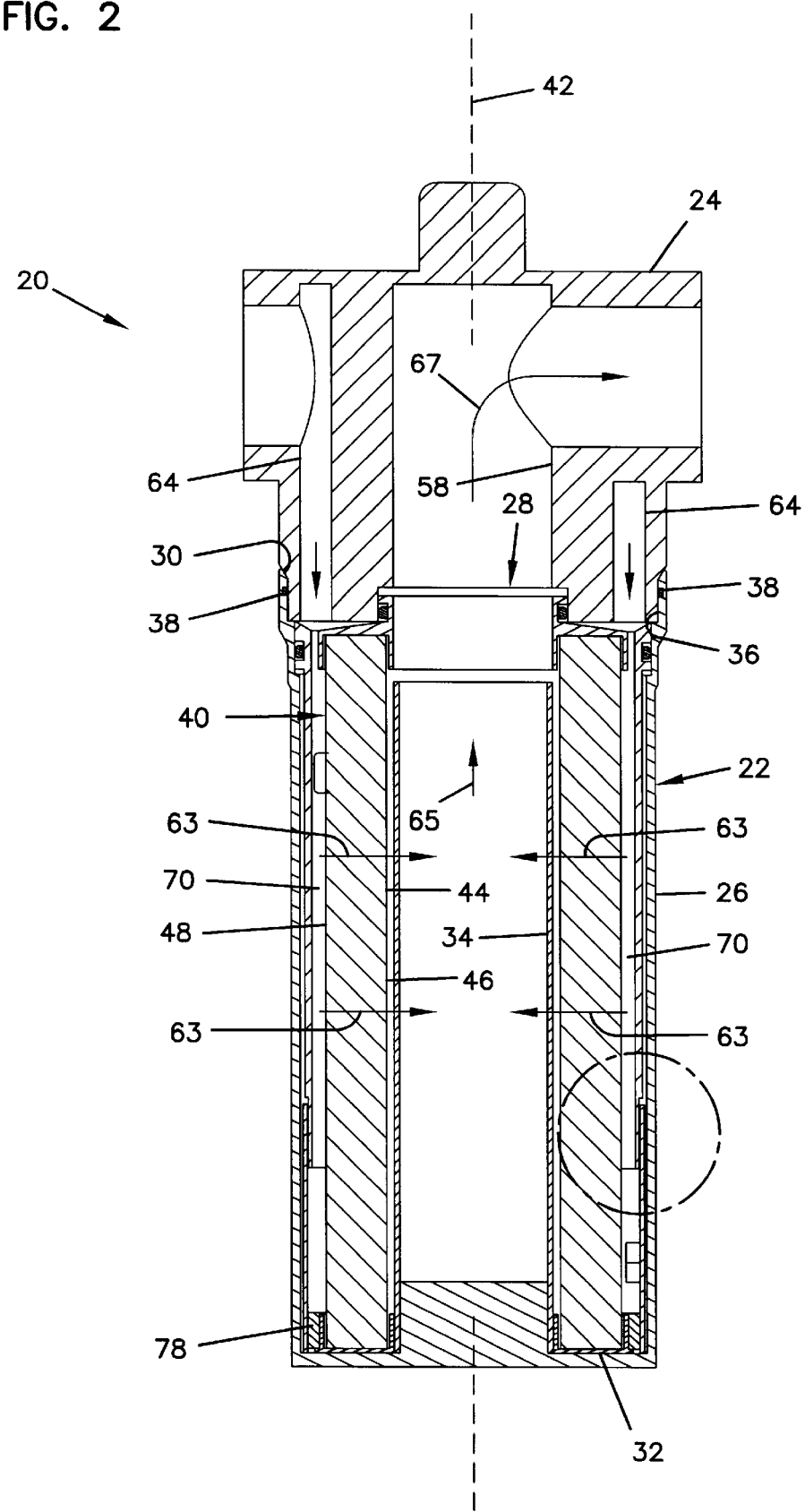
FIG. 2 is a cross-sectional view taken longitudinally through the filter assembly and filter head of FIG. 1.

Referring to FIGS. 1 and 2, a filter assembly 20 constructed in accordance with the principles of the present invention is illustrated. The filter assembly 20 is connected to a filter head 24. In use of the assembly 20, the filter head 24 is placed in fluid communication with a system such as a hydraulic system (not shown). As will be described later in the specification, the filter head 24 is adapted for directing "dirty" hydraulic fluid (e.g., hydraulic oil) from the system into the filter assembly 22, and for directing "clean" hydraulic fluid from the filter assembly 22 back to the hydraulic system. Preferably, the filter assembly 22 threads onto the filter head 24.

Referring still to FIG. 2, the filter assembly 22 includes an outer filter housing 26 and a removable, core-less filter insert 28 that fits completely within the outer housing 26. The outer housing 26 is generally cylindrical and includes an open end 30 positioned opposite from a closed end 32. A perforated cylindrical core 34 is permanently or fixedly connected to the closed end 32 of the housing 26. Internal threads 36 are provided at the open end 30 of the outer housing 26 for allowing the housing 26 to be threaded onto exterior threads formed on the filter head 24. Of course, a reverse thread arrangement could also be used. An annular seal 38 is used to prevent hydraulic fluid from leaking between the housing 26 and the filter head 24.

It will be appreciated that the outer housing 26 has a conventional "bowl" or "can" type configuration defining an inner cavity sized for receiving the filter insert 28. Preferably, the filter housing 26 has a generally thin-walled construction and is formed from a metal such as aluminum, steel or other suitable material.

Figure 3:
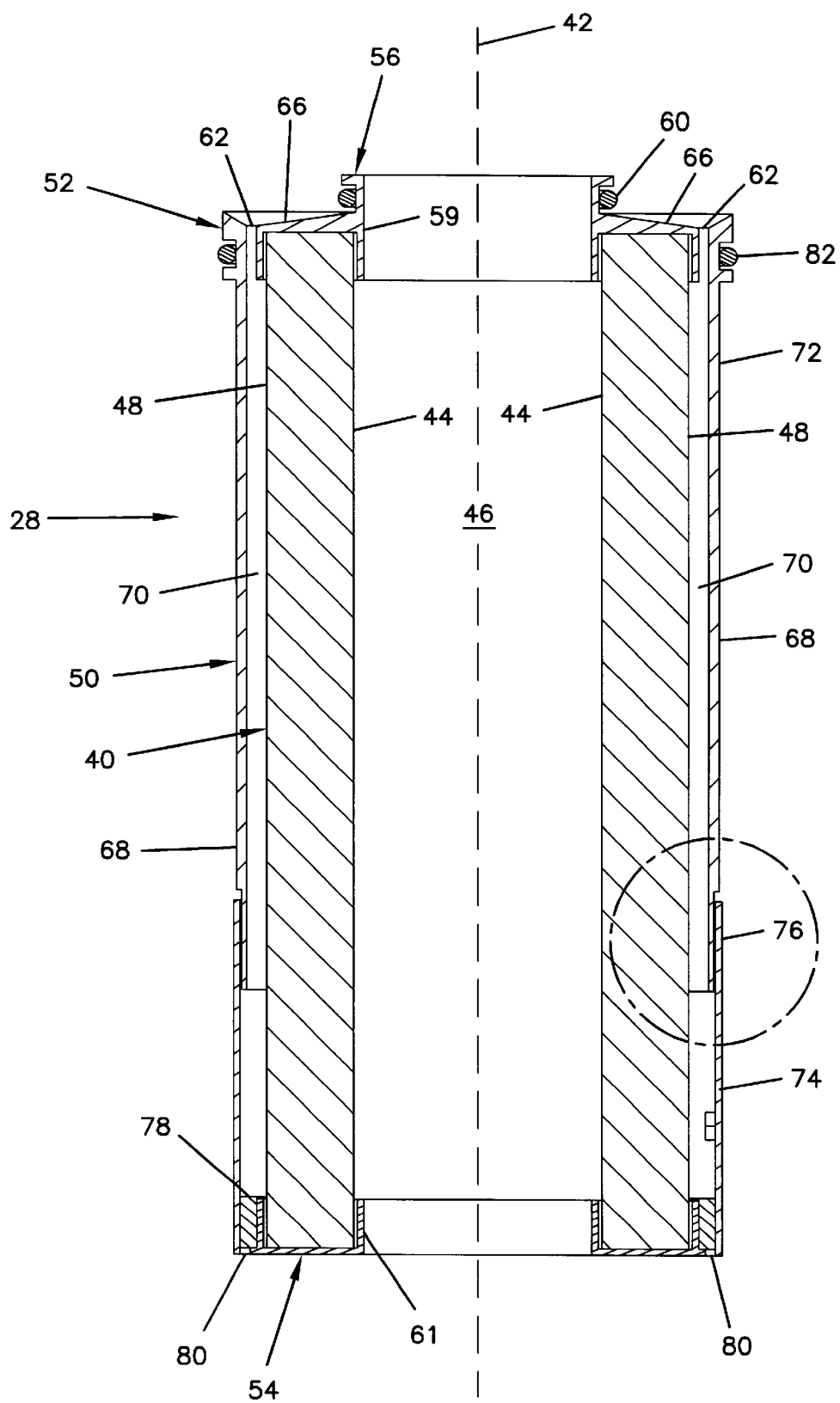
FIG. 3 is a cross-sectional view taken longitudinally through the filter insert used by the filter assembly of FIG. 1.

Referring to FIG. 3, the filter insert 28 of the filter assembly 22 includes a filter element 40 aligned along a longitudinal axis 42 that extends between top and bottom ends of the filter element 40. The filter element 40 includes a cylindrical inner side 44 that faces toward the longitudinal axis 42 and defines a central axial opening 46 that extends along the longitudinal axis 42. The filter element 40 also includes a cylindrical outer side 48 that faces away from the longitudinal axis. It will be appreciated that the filter element 40 could be made of any conventional material typically used for liquid filtration. Exemplary types of material include sintered metal, cellulose, synthetic media, wire mesh, and glass fibers. Also, either pleated or unpleated filter media can be used.

Referring again to FIG. 3, the filter insert 28 also includes an insert body 50 connected to the filter element 40. The insert body 50 includes a top end cap 52 in which the top end of the filter element 40 is potted, and a bottom end cap 54 in which the bottom end of the filter element is potted. The term "potted" is intended to mean that the ends of the filter element 40 are sealed and secured to the end caps 52, 54. For example, an adhesive separate from the end caps 52, 54 and the filter element 40 can be used. Alternatively, the material forming the end caps 52, 54 can be used as a potting compound. For example, by making the end caps 52, 54 of a liquid polyurethane foam, the polyurethane foam can be cured with the ends of the filter element 40 embedded within the liquid polyurethane. Upon curing, the polyurethane solidifies and forms a sealed, adhesive-like bond with the ends of the filter element 40. In still another embodiment, the end caps 52, 54 can be made of a hot melt material such as hot melt plastic. To manufacture such an embodiment, the hot melt material is heated into a viscous liquid. The ends of the filter element 40 are then embedded in the viscous liquid. Upon cooling, the hot melt material solidifies and forms a sealed, adhesive-like bond with the ends of the filter element 40.

The top and bottom end caps 52, 54 have annular shapes and respectively define top and bottom openings 59 and 61 that coaxially align with the central opening 46 of the filter element 40. The top end cap 52 includes an upwardly projecting cylindrical extension 56 that is aligned along the longitudinal axis 42. The cylindrical extension 56 is sized to fit within a central outlet passage 58 (shown in FIG. 2) defined by the filter head 24. When the cylindrical extension 56 is inserted within the outlet passage 58, a radial seal 60 provides a fluid tight seal between the cylindrical extension 56 and the filter head 24.

The top end cap 52 also defines a plurality of inlet openings 62 for allowing unfiltered oil to enter the filter insert 28. The inlet openings 62 are arranged in a ring that surrounds the longitudinal axis 42. Each of the inlet openings 62 extends downwardly through the top end cap 52. When the filter assembly 22 is mounted on the filter head 24 (as shown in FIG. 2), the inlet openings 62 align with an annular passageway 64 defined by the filter head 24. The annular passageway 64 provides unfiltered, pressurized hydraulic fluid from the hydraulic system to the filter assembly 22. The unfiltered hydraulic oil enters the filter assembly 22 through the inlet openings 62 defined by the top end cap 52. A top surface 66 of the top end cap 62 ramps or tapers toward the inlet openings 62 to prevent contaminants from accumulating on the top surface 66. The seal 60 inhibits unfiltered hydraulic fluid from bypassing the filter element 40, and also inhibits filtered fluid from circulating back to the inlet openings 62.

Referring back to FIG. 3, the insert body 50 of the filter insert 28 also includes a cylindrical wall 68 (e.g., a liner, barrier or other type of contaminant containment structure) that surrounds the filter element 40. The cylindrical wall 68 extends completely between the end caps 52 and 54 and preferably is directly mechanically connected to the end caps 52 and 54 (i.e., the cylindrical wall 68 directly contacts the end caps 52 and 54 as compared to being indirectly connected to the end caps 52 and 54 by an intermediate structure such as a thread plate). As shown in FIG. 3, the cylindrical outer wall 68 terminates at the top and bottom end caps 52 and 54. The cylindrical outer wall 68 is preferably spaced-apart from the outer side 48 of the filter element 40 such that an annular flow passageway 70 is defined between the cylindrical wall 68 and the filter element 40. In certain embodiments (e.g., a filter assembly with a 100 millimeter diameter), a spacing gap of approximately 5–6 millimeters is formed between the cylindrical wall 68 and the outer side 48 of the filter element 40.

It will be appreciated that the inlet openings 62 defined by the top end cap 52 are in fluid communication with the annular flow passageway 70. Since unfiltered hydraulic fluid is provided to the filter assembly 22 through the inlet openings 62, the annular flow passageway 70 is located on a "dirty side" of the filter insert 28, while the central opening 46 is located on a "clean side" of the filter insert 28. In use of the assembly 20, the annular passageway 70 functions to direct hydraulic fluid from the inlet openings 62 to the filter element 40. Additionally, the annular passageway 70 also functions to capture, trap or otherwise contain contaminants within the filter insert 28 (i.e., contaminants are permanently trapped between the filter element 40 and the wall 68). Therefore, the annular passageway can also be referred to as a contaminant chamber or a contaminant containment chamber. Preferably, contaminant particles (e.g., dirt, metal, etc.) having diameters greater 2 microns, or in the range of 2–50 microns, are retained in the chamber. In an alternative embodiment, particles sized larger than 0.5 microns are captured.

In the embodiment of FIG. 3, the cylindrical wall 68 is preferably made of a material (e.g., solid plastic) that is impervious to liquids (e.g., hydraulic oil). The cylindrical wall 68 preferably has a two-piece construction. For example, a top portion 72 of the cylindrical wall 68 can be formed as a single, unitary and monolithic piece (e.g., an injection-molded piece) with the top end cap 52. Also, a bottom portion 74 of the cylindrical wall 68 can be formed as a single, unitary and monolithic piece (e.g., an injection-molded piece) with the bottom end cap 54. The top and bottom portions 72 and 74 of the cylindrical wall 68 are connected at an overlapping joint 76. Preferably, the joint 76 is sealed with an adhesive sealant.

As shown in FIG. 3, the portion of the annular flow passageway 70 corresponding to the bottom portion 74 of the cylindrical wall 68 is larger than the portion of the annular flow passageway 70 corresponding to the top portion 72 of the cylindrical wall 68. An annular filter 78 is positioned within the enlarged portion of the annular flow passageway 70. The annular filter 78 is positioned within the bottom end cap 54 and is located outside the main filter element 40 (i.e., on the "dirty" side of the filter element 40). A plurality of drainage openings 80 are defined by the insert body 50 adjacent to the annular filter 78. For example, as shown in FIG. 3, the drainage openings 80 are defined through the bottom end cap 54 at locations oriented directly below the annular filter 78. Alternatively, the drainage openings 80 could be formed radially through the cylindrical wall 68 at locations directly adjacent to the annular filter 78. Preferably, the drainage openings 80 are positioned such that fluid within the annular flow passageway 70 must first be filtered by the annular filter 78 before being discharged through the drainage openings 80.

The filter insert 28 also includes a radial seal 82 that surrounds the cylindrical wall 68 at a location adjacent to the top end cap 52. When the filter insert 28 is inserted within the housing 26, the radial seal 82 forms a fluid tight seal with the interior surface of the filter housing 26 to prevent unfiltered hydraulic fluid from reaching or contaminating the interior surface of the housing 26. Alternatively, a face seal located along the top surface of the top end cap 52 could also be used. For such an embodiment, the face seal would contact the filter head 24 at a location inside the filter housing 26 to prevent hydraulic fluid from flowing between the filter insert 28 and the housing 26.

To assemble the filter assembly 22, the filter insert 28 is placed in the filter housing 26 such that the core 34 of the housing 26 extends through the central opening 46 of the filter element 40. Once the filter insert 28 is placed within the filter housing 26, the housing 26 can be threaded on the filter head 24. FIG. 2 shows the housing threaded on the filter head 24. As so threaded, the cylindrical extension 56 of the top end cap 52 fits within the outlet opening 58 of the filter head 24, and the inlet openings 62 of the top end cap 52 align with the annular passageway 64 of the filter head 24.

Once the filter assembly 22 is mounted on the filter head 24, the filtration process can be initiated. During the filtration process, unfiltered hydraulic fluid from the hydraulic system travels downward through the annular passageway 64 and enters the annular flow passage 70 of the filter insert 28 through the inlet openings 62 of the top end cap 52. The hydraulic fluid then travels radially inwardly (as shown by arrows 63) through the filter element 40. Contaminants within the hydraulic fluid are captured in the flow passageway 70, while clean, filtered hydraulic fluid enters the central opening 46 through the inner side 44 of the filter element 40. The clean hydraulic fluid within the central opening 46 flows in an upward direction (see arrow 65) through the top opening 59 defined by the top end cap 52, and exits the filter head 24 through the outlet passageway 58 (see arrow 67).

When the filter element 40 has become fully loaded with contaminants, it is necessary to replace the contaminant loaded filter insert with a new filter insert. To accomplish this, the filter housing 26 is unthreaded from the filter head 24. Next, the filter insert 28 is removed from the filter housing 26. As the filter inset 28 is removed from the filter housing 26, some of the unfiltered hydraulic fluid within the annular flow passageway 70 flows downward through the annular filter 78 and is drained into the filter housing 26 through the drainage openings 80. The remainder of the unfiltered hydraulic fluid flows through the filter element 40 and drains into the filter housing 26 through bottom opening 61 defined by the bottom end cap 54. Regardless of the flow path, the unfiltered hydraulic fluid within the annular flow passageway 70 is filtered prior to being drained into the filter housing 26. Consequently, only clean, filtered hydraulic fluid is drained into the housing 26. The contaminants are fully contained within the annular flow passageway 70, and are discarded with the filter insert 28. In this manner, a new filter insert 28 inserted within the filter housing 26 will not be contaminated by the hydraulic fluid present in the filter housing 26.

It is preferred for the filter insert 28 to be made completely from nonmetallic components. By using non-metallic components, disposal techniques such as incineration can more readily be used. Additionally, in another embodiment, a drain opening can be provided through the bottom of the housing in fluid communication with the central opening 46. Preferably, the drain opening is sealed or closed by a drain plug (e.g., a bolt). By removing the plug, hydraulic fluid within the filter assembly 22 can be drained before the assembly 22 is disconnected from the filter head 24.

Figure 4:
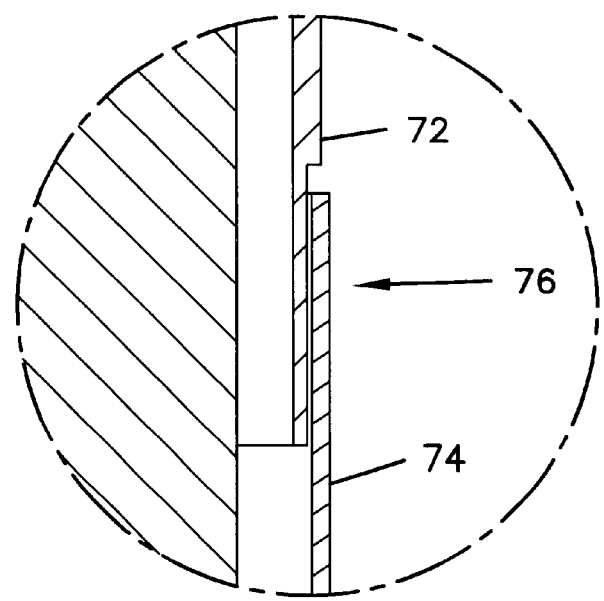
FIG. 4 is a detailed view of a portion of FIG. 3.
Figure 5:
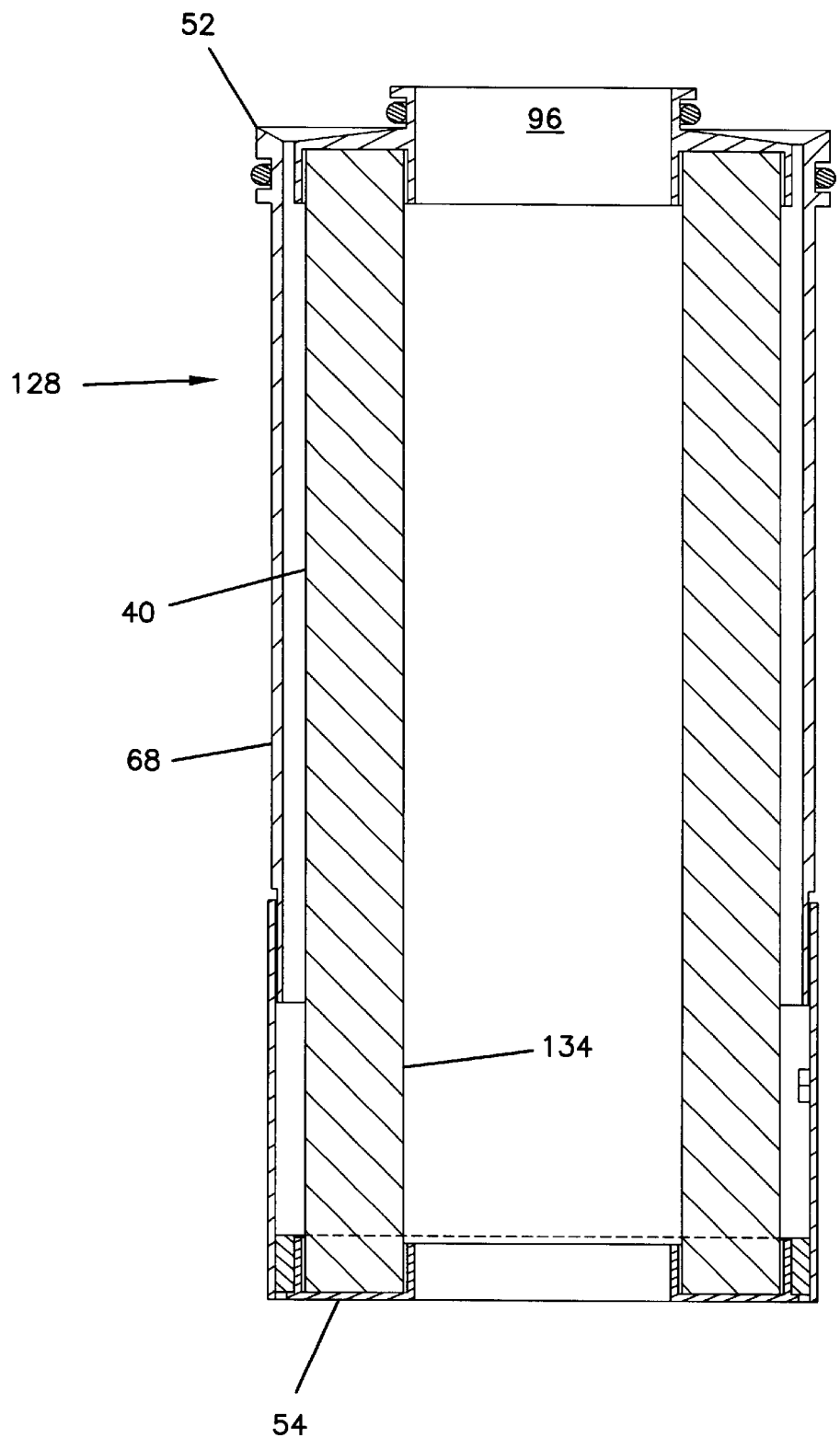
FIG. 5 is a cross-sectional view taken longitudinally through a filter insert that is a second embodiment of the present invention.

FIG. 5 illustrates a second filter insert 128 constructed in accordance with the principles of the present invention. The filter insert 128 has substantially the same configuration as the filter insert 28 shown in FIGS. 3 and 4. For example, the filter insert 128 includes the same filter element 40, end caps 52 and 54 and cylindrical wall 68 as the embodiment shown in FIGS. 3 and 4. The only difference between the two embodiments is that the filter insert 128 includes an integral perforated core 134 that is preferably potted within the top and bottom end caps 52 and 54. The perforated core 134 is preferably made of a non-metallic material such as plastic. By using the integral core 134, the filter insert 128 can be used with a housing that does not have a core.

Figure 6:
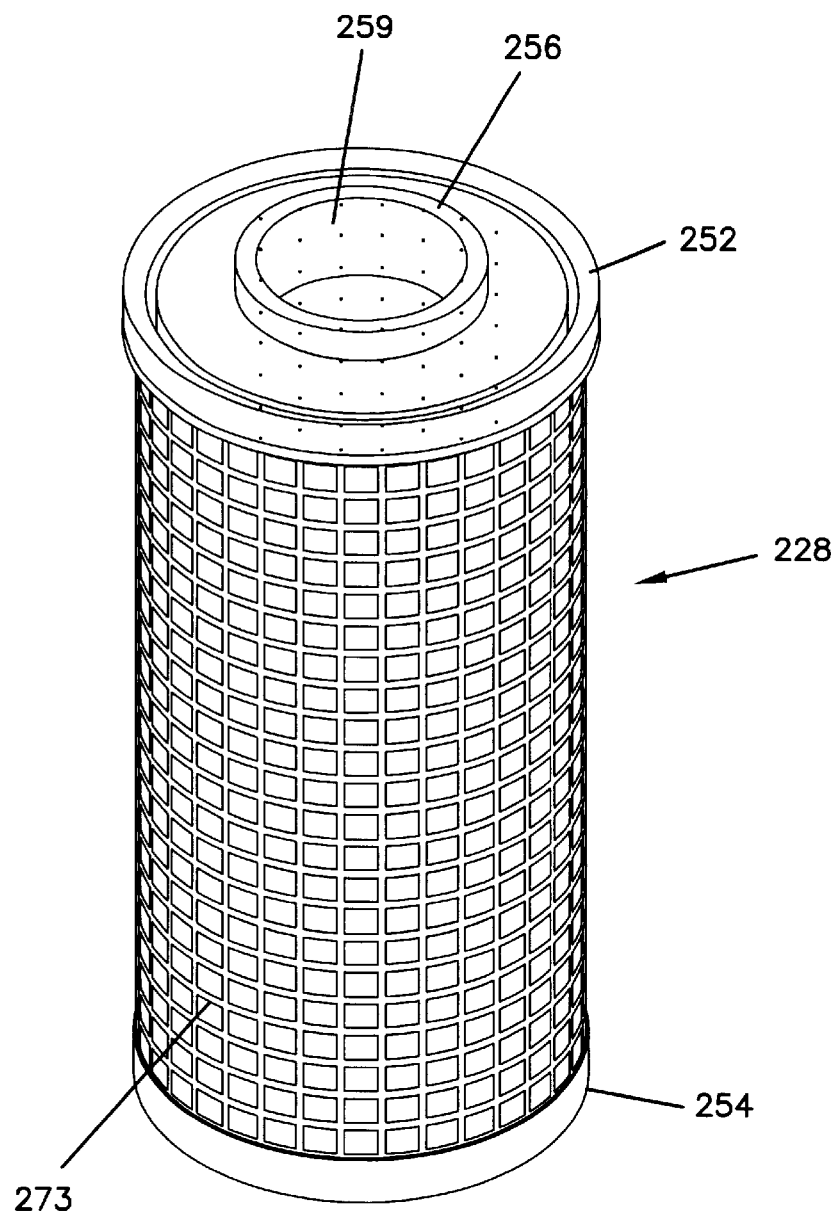
FIG. 6 is a perspective view of a filter insert that is a third embodiment of the present invention.
Figure 7:
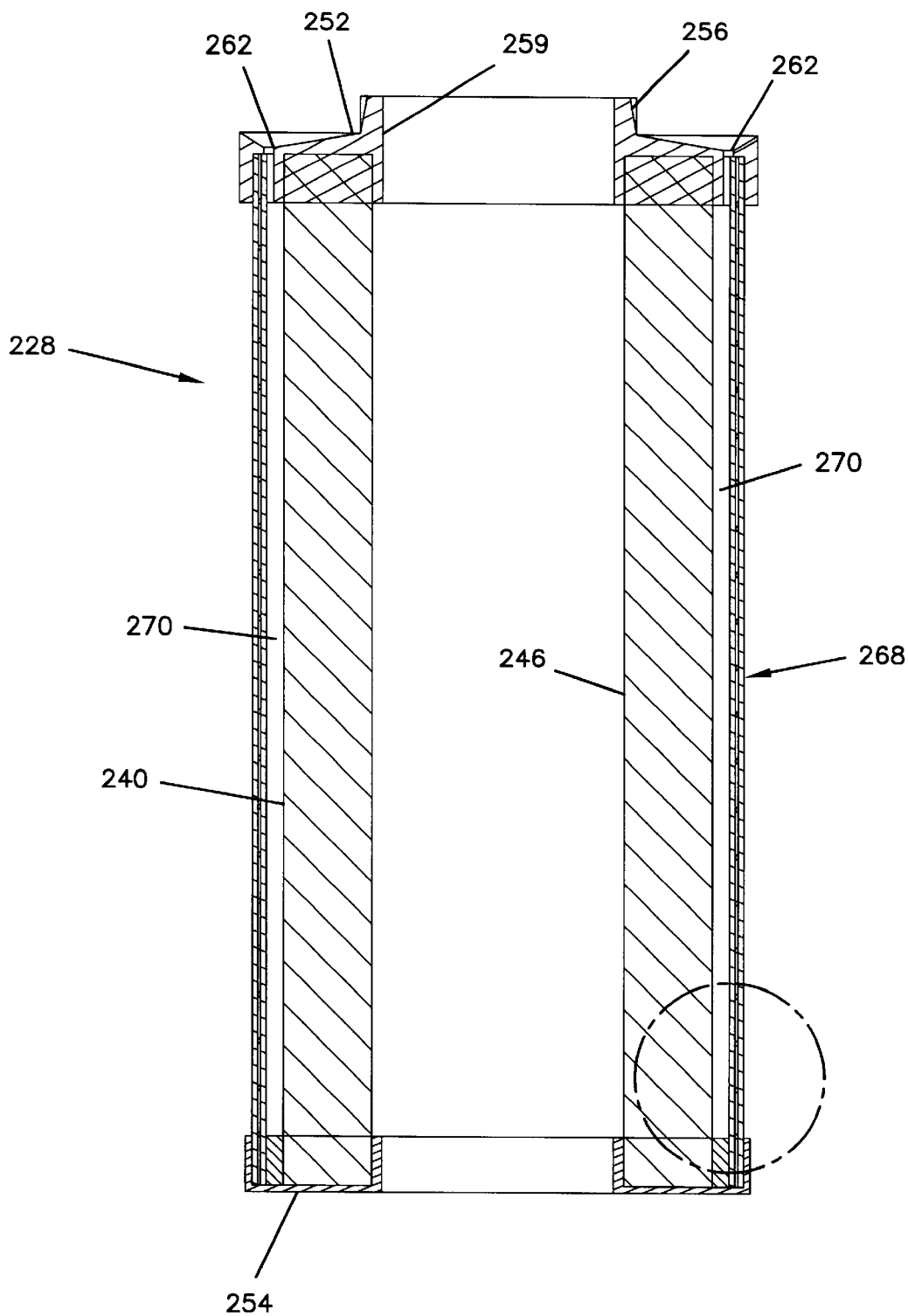
FIG. 7 is a cross-sectional view taken longitudinally through the filter insert of FIG. 6.
Figure 8:
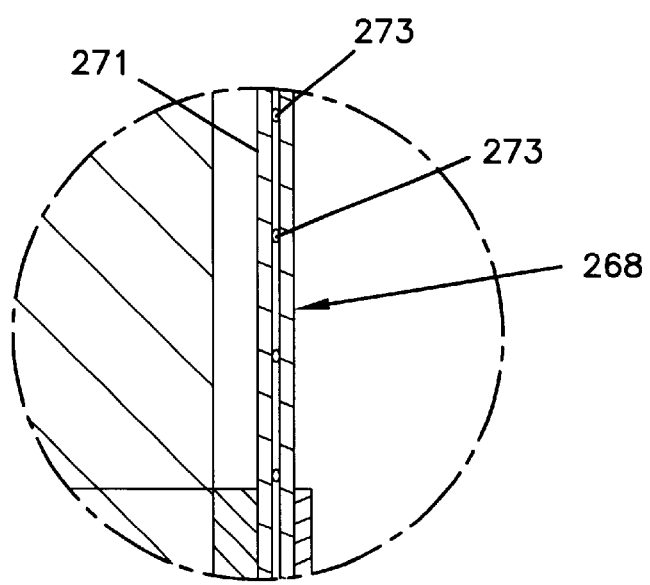
FIG. 8 is a detailed view of a portion of the filter insert of FIG. 7.

FIGS. 6–8 illustrate a third filter insert 228 constructed in accordance with the principles of the present invention. The filter insert 228 is adapted to be inserted within a filter housing such as the filter housing 26 shown in FIGS. 1 and 2. As shown in FIG. 7, the filter insert 228 includes a cylindrical filter element 240 defining a central axial opening 246. The ends of the filter element 240 are potted within top and bottom end caps 252 and 254 that are preferably made of a resilient material such as polyurethane foam. A cylindrical wall 268 surrounds the filter element 240, and is spaced-apart from the filter element 240 such that a flow passageway 270 is defined between the wall 268 and the filter element 240. As best shown in FIG. 8, the cylindrical wall 268 includes a filter media 271 (e.g., a filter sheet) supported by a mesh framework 273. The media 271 preferably defines a plurality of openings that are sufficiently large to allow hydraulic fluid to pass therethrough, but sufficiently small such that contaminants within the hydraulic fluid are captured within the flow passageway 270 on the inside surface of the media 271. In one particular non-limiting embodiment, the media 271 has a pore size in the range of 55–90 microns, a permeability in the range of 8–18 meters/minute, and a thickness in the range of 0.35–1.63 millimeters.

Similar to the previous embodiments, the top end cap 252 defines a plurality of inlet openings 262 in fluid communication with the flow passageway 270. The use of a resilient material such as polyurethane foam to form the top end cap 252 is advantageous because separate O-ring type seals can be eliminated. For example, because the polyurethane is resilient, the outer radial surface of the top end cap 252 can itself form a radial seal with the inner surface of the housing 26 of FIGS. 1 and 2. The radial seal prevents unfiltered hydraulic fluid from circumventing the insert 228 and contaminating the housing 26.

The top end cap 252 also includes an upwardly projecting extension 256 defining a top outlet opening 259 of the filter insert 228. By providing the extension 256 in the shape of a truncated cone, the urethane of the top end cap 252 can be used to seal the outlet location of the filter insert 228 (e.g., the extension can form a seal between the insert 228 and a filter head such as the filter head 24 of FIG. 2). In an alternative embodiment, a radial projection can be integrally formed on the outer surface of the extension 256 to provide an outlet seal.

Similar to previous embodiments, the filter insert 228 is adapted to prevent contaminants from accumulating in its corresponding reusable housing. For example, when the filter insert 228 is removed from the filter housing, unfiltered hydraulic fluid within the flow passageway 270 drains either through the media 271 or through the filter element 240. Regardless of the flow path, the hydraulic fluid draining from the filter insert 228 into the housing will be filtered. Consequently, all of the contaminants at the "dirty" side of the filter insert 228 are retained within the flow passageway 270 and discarded with the filter insert 228.

Figure 9:
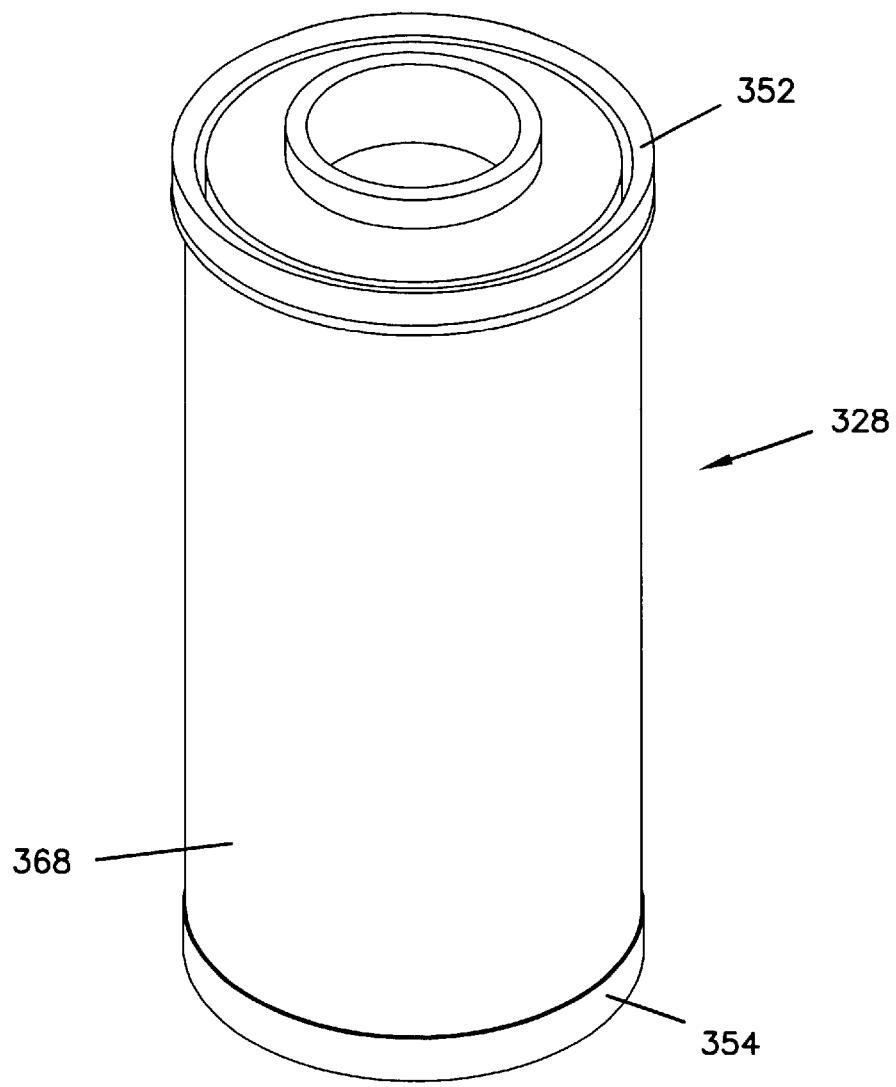
FIG. 9 is a perspective view of a fourth embodiment of the present invention.
Figure 10:
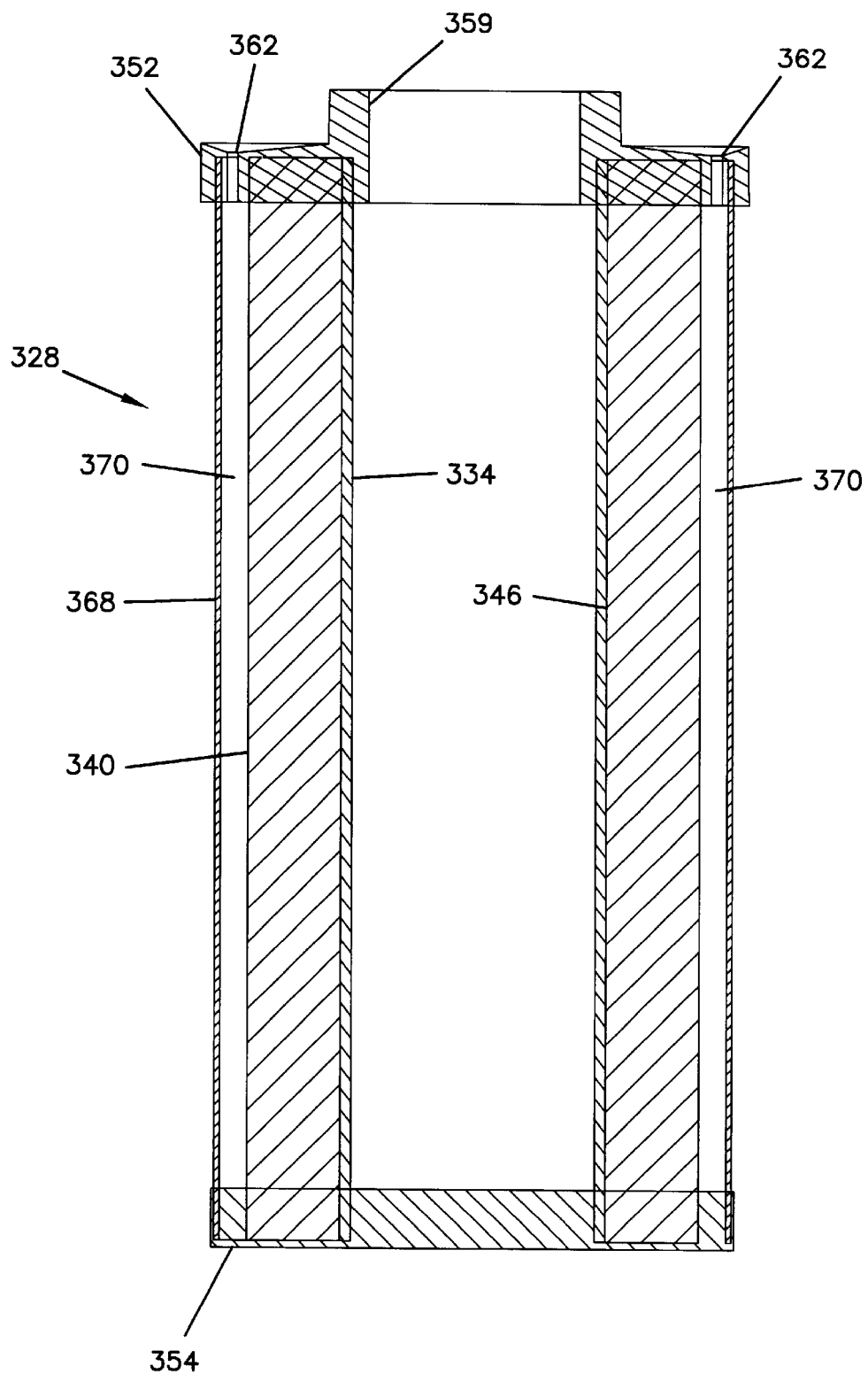
FIG. 10 is a cross-sectional view taken longitudinally through the filter insert of FIG. 9.

FIGS. 9 and 10 illustrate a fourth filter insert 328 constructed in accordance with the principles of the present invention. Similar to the previous embodiments, the filter insert 328 includes a cylindrical filter element 340 defining a central axial opening 346. Top and bottom ends of the filter element 340 are respectively potted within top and bottom end caps 352 and 354. A perforated inner core 334 for supporting the filter element 340 is positioned within the central opening 346 and potted within the end caps 352 and 354. The inner core 334 is preferably made of a plastic material.

The filter insert 328 also includes a cylindrical outer wall 368 that surrounds the filter element 340. The outer wall 368 is spaced-apart from an outer side of the filter element 340 such that an annular flow passageway 370 is defined between the outer wall 368 and the filter element 340. A top portion of the cylindrical outer wall 368 is potted within the top end cap 352 and the bottom portion of the cylindrical wall 368 is potted within the bottom end cap 354. The wall 368 is preferably made of a liquid impermeable material such as solid plastic.

The top and bottom end caps 352 and 354 are preferably made of a resilient material such as polyurethane foam. The top end cap 352 defines a plurality of inlet openings 362 that are in fluid communication with the flow passageway 370. The top end cap 352 also includes a top outlet opening 359.

In use of the filter insert 328, unfiltered oil is pumped into the flow passageway 370 through the inlet openings 362. From the flow passageway 370, the unfiltered hydraulic fluid flows radially through the filter element 340 to the central opening 346. From the central opening 346, the filtered oil flows in an upward direction and exits the filter insert 328 through the top outlet opening 359. The bottom end cap 354 preferably closes a bottom end of the central opening 346. Consequently, hydraulic fluid within the central opening 346 is inhibited by the bottom end cap 354 from existing the filter element 340 through the bottom of the filter insert 328.

Preferably, the filter insert 328 is used in combination with a coreless housing (not shown) adapted to be secured to a filter head such as the filter head 24 of FIGS. 1 and 2. After the filter insert 328 has been loaded with contaminants, the housing is disconnected from the filter head and the filter insert 328 is removed from the housing. Because the cylindrical wall 368 is made of an impervious material and the bottom of the filter insert 328 is closed by the bottom end cap 354, hydraulic fluid contained within the filter insert 328 remains in the insert 328 as the insert is removed from the housing. For such an embodiment, the hydraulic fluid within the filter insert 328 is preferably discarded along with the filter insert 328.

In alternative embodiments, a hole can be provided through the bottom end cap 354 in fluid communication with the central opening 346. In such a configuration, filtered hydraulic fluid will be allowed to drain from the filter insert 328, and contaminants filtered from the hydraulic fluid will be captured or otherwise retained in the flow passageway 370. Because of the wall 368, dirty hydraulic fluid within the flow passageway 370 is required to first pass through the filter element 340 before draining from the filter insert 328.

Figure 11:
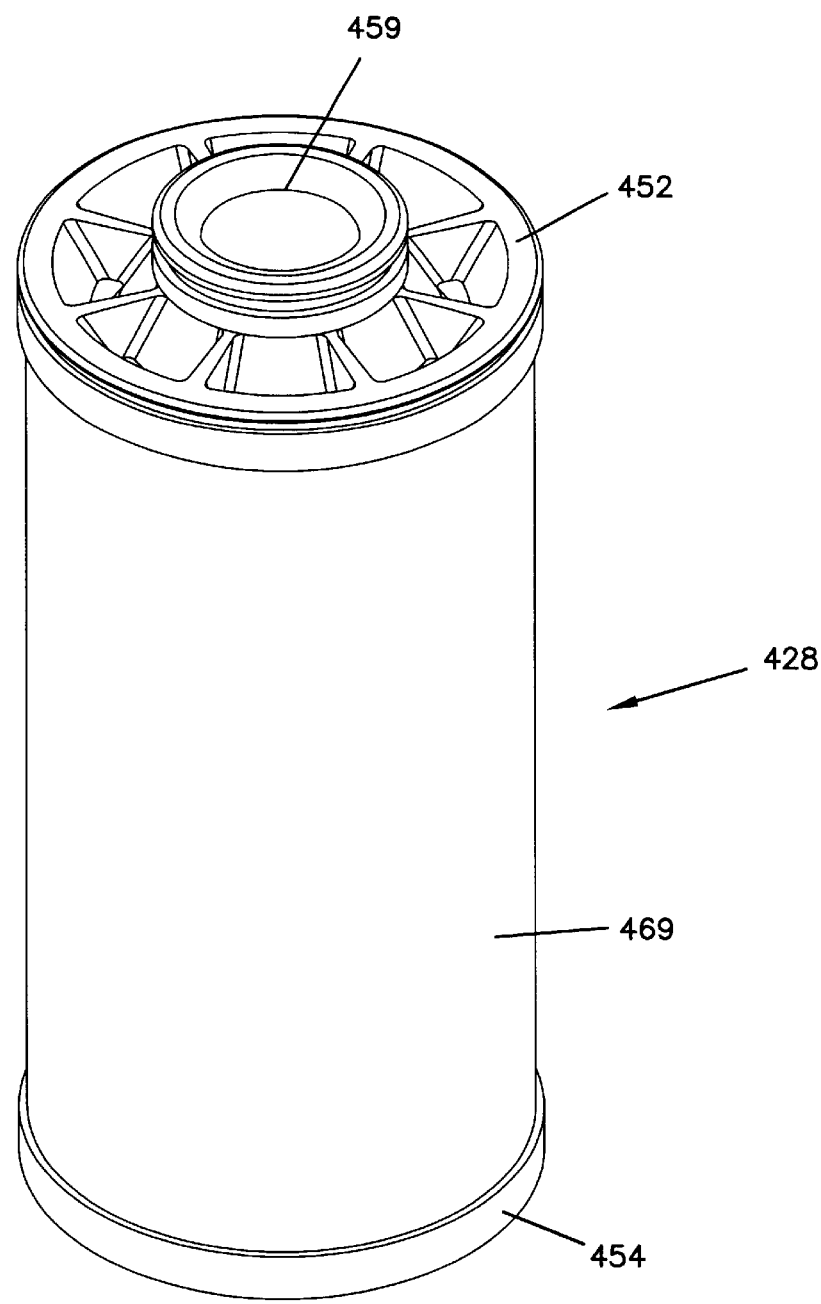
FIG. 11 is a fifth embodiment of the present invention.
Figure 12A:
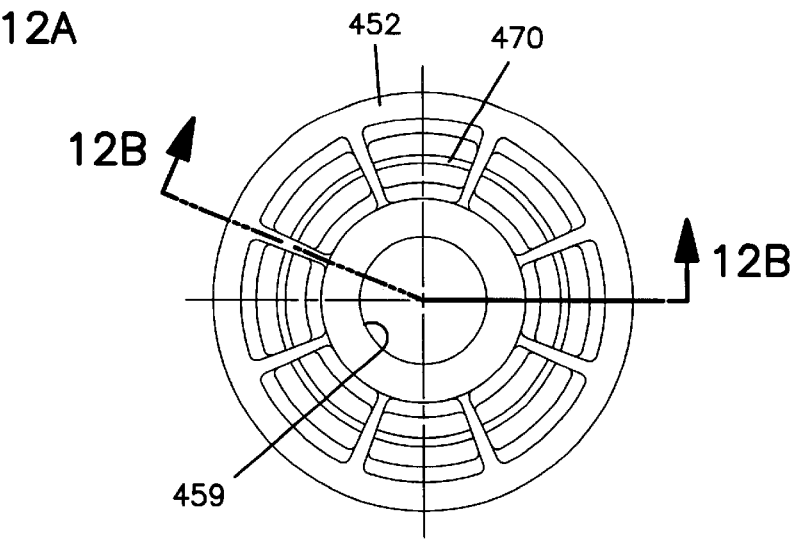
FIG. 12A is a top view of the filter insert of FIG. 11.
Figure 12B:
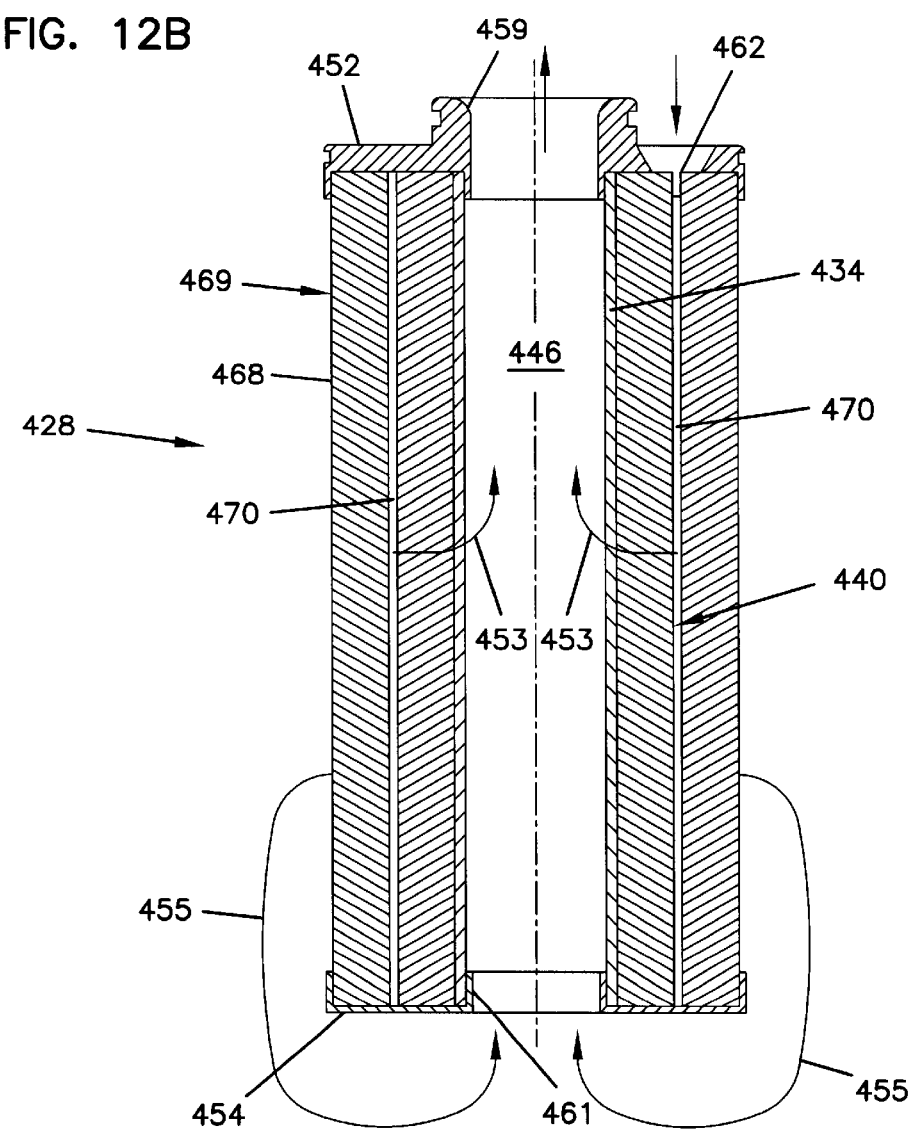
FIG. 12B is a cross-sectional view taken along section line 12B—12B of FIG. 12A.

FIGS. 11, 12A and 12B show a fifth filter insert 428 constructed in accordance with the principles of the present invention. The filter insert 428 includes an inner filter element 440 supported by a perforated core 434. However, it will be appreciated that in alternative embodiments, the insert 428 can be core-less.

The filter element 440 defines an axial opening 446. A concentric outer wall 468 surrounds the inner filter element 440. The outer wall 464 comprises a second filter element 469 that is radially spaced from the first filter element 440 such that an annular flow passageway 470 is formed thereinbetween. The second filter element 469 is shown as having the same wall thickness as the first filter element 440. However, based on use requirements and performance criteria, the thickness of the filter elements 440 and 469 can be varied relative to each other. In one particular embodiment, the filter insert 428 has an outer diameter of about 3.9 inches and an axial length of about 8.4 inches, the filters 440 and 469 each have a wall thickness of about 0.53 inches, and a spacing gap of about 0.08 inches is formed between the filters 440 and 469.

The first and second filter elements 440 and 469 and the perforated core 434 are preferably potted within top and bottom end caps 452 and 454. The top end cap 452 defines a plurality of inlet openings 462 in fluid communication with the flow passageway 470, and a top outlet opening 457 in fluid communication with the axial opening 446 defined by the first filter element 440. The bottom end cap 454 defines a bottom opening 461 that is also in fluid communication with the axial opening 446 of the inner filter element 440.

During the filtration process, unfiltered hydraulic fluid enters the annular flow passageway 470 through the inlet openings 462. From the flow passageway 470, the hydraulic fluid flows either radially inward through the inner filter element 440, or flows radially outward through the outer filter element 469. For example, arrows 453 illustrate that oil can flow through the inner filter element 440 to the axial opening 446. Also, arrows 455 show that the oil can also flow radially outward through the outer filter element 469. As shown by the arrows 455, hydraulic fluid filtered by the outer filter element 469 flows around the bottom end of the filter insert 428 and enters the axial opening 446 of the filter element 440 through the bottom opening 461 defined by the bottom end cap 454.

Similar to the previous embodiments, the filter insert 428 is adapted to be replaceably mounted within a housing adapted for connection to a filter head. Also similar to the previous embodiments, the filter insert 428 is configured to prevent contaminants from accumulating in the housing and possibly contaminating subsequent filter inserts. For example, when the filter insert 428 is removed from the housing, contaminants filtered from the hydraulic fluid are captured within the flow passageway 470 between the two separate filter elements 440 and 469. Unfiltered hydraulic fluid within the flow passageway 470 is required to pass through one of the filters 440, 469 before being drained from the filter insert 428.

Figure 13:
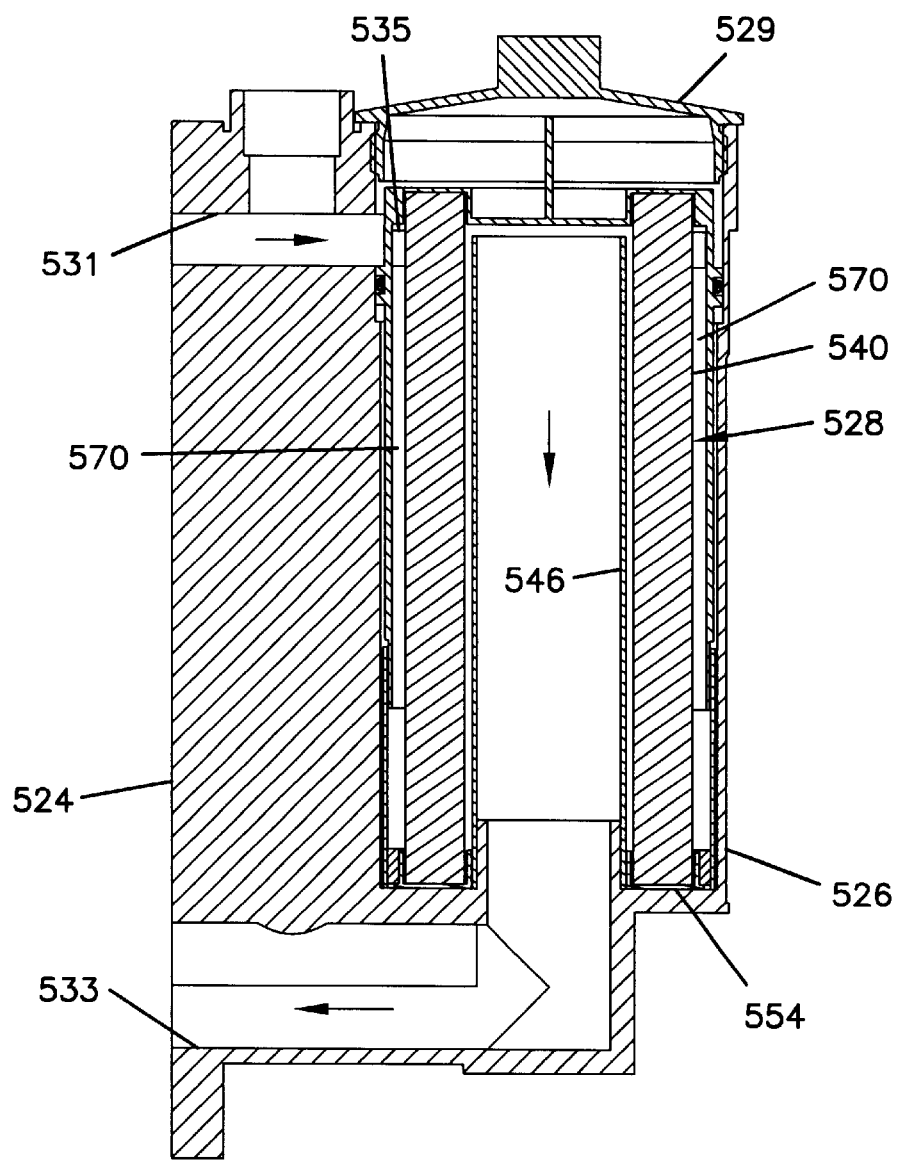
FIG. 13 is a cross-sectional view taken through a filter assembly that is a sixth embodiment of the present invention.
Figure 14:
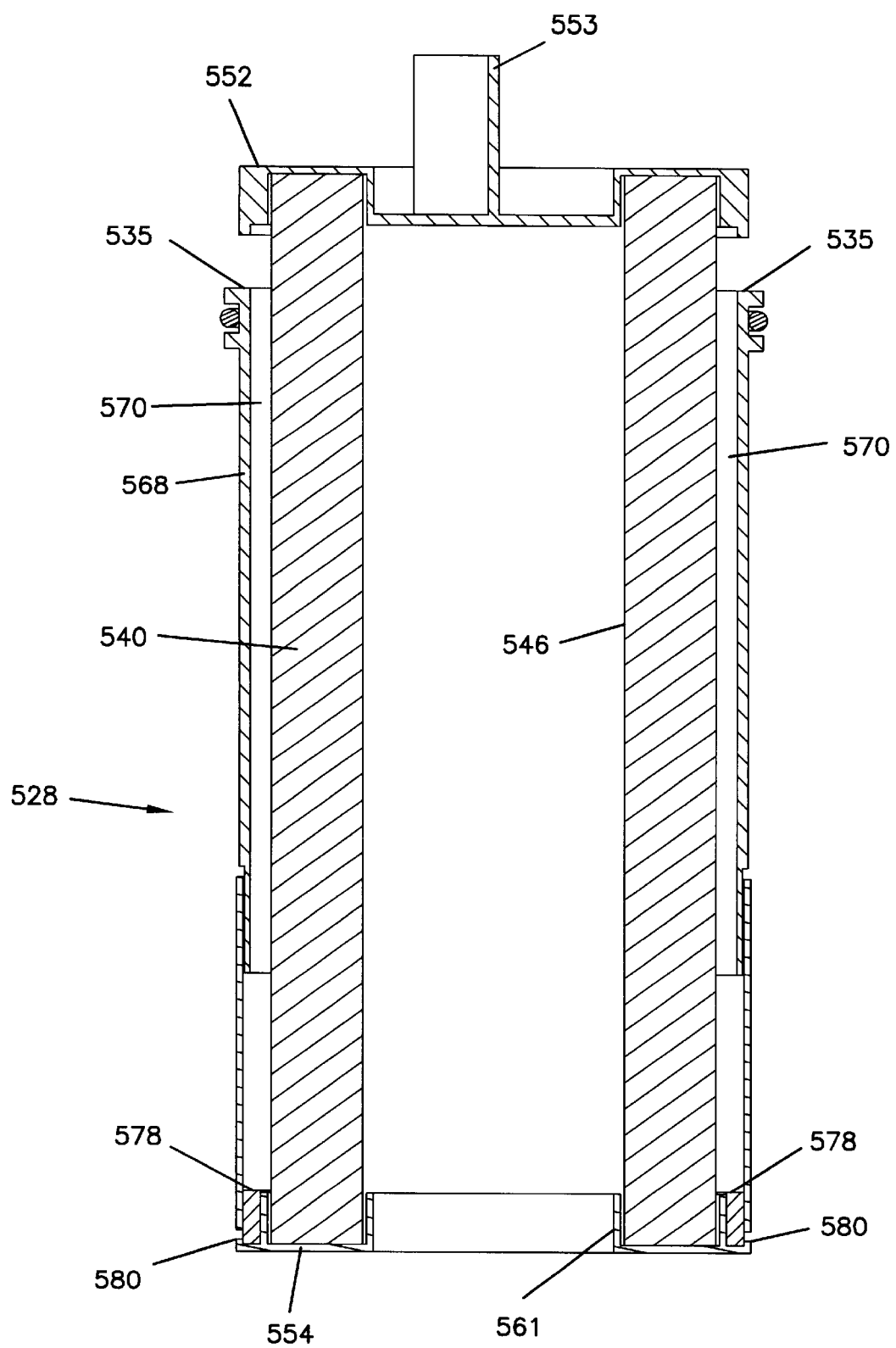
FIG. 14 is a cross-sectional view taken longitudinally through the filter insert used by the filter assembly of FIG. 13.

FIGS. 13 and 14 illustrate a sixth filter insert 528 constructed in accordance with the principles of the present invention. Referring to FIG. 13, the filter insert 528 is shown inserted within a top loading canister 526 that is integrally formed with a filter head 524. The canister 526 is generally cylindrical and has an open top end that is enclosed by a threaded cover 529. The filter head 524 defines an inlet passage 531 for providing unfiltered hydraulic fluid (e.g., from a hydraulic system) to the canister 526, and an outlet passage 533 for receiving filtered hydraulic fluid from the canister 526 and for directing the filtered hydraulic fluid back to the hydraulic system.

Referring to FIG. 14, the filter insert 528 includes a cylindrical filter element 540 defining a central axial opening 546. Upper and lower ends of the filter element 540 are respectively potted within top and bottom end caps 552 and 554. The top end cap 552 includes a handle 553 for lifting the insert 528 from the canister 526. The insert 528 also includes a cylindrical outer wall 568 that surrounds and is spacedapart from the filter element 540. An annular flow passageway 570 is defined between the outer wall 568 and the filter element 540.

As shown in FIGS. 13 and 14, the cylindrical wall 568 is made of a liquid impervious material such as solid plastic. Adjacent the top end cap 552, the cylindrical wall 568 defines a plurality of radial inlet openings 535. Adjacent the bottom end cap 554 the cylindrical wall 568 defines a plurality of radial drainage openings 580. A secondary annular filter 578 is positioned within the annular flow passageway 570 adjacent to the drainage openings 580. The filter 578 is preferably potted within the bottom end cap 554 and is positioned such that hydraulic fluid within the annular flow passageway 570 is required to first pass through the annular filter 578 before draining through the drainage openings 580.

In use of the filter assembly 520, hydraulic fluid from the hydraulic system flows from the inlet passage 531 of the filter head 524 into the annular flow passageway 570 through the radial inlet openings 535 defined through the cylindrical wall 568. The hydraulic fluid then flows through the filter element 540 into the central axial opening 546. Once within the central axial opening 546, the filtered oil flows in a downward direction and exits the filter insert 528 through a bottom opening 561 defined by the bottom end cap 554. Thereafter, the oil flows through the outlet passage 533 defined by the filter head 528 back to the hydraulic system.

When the filter insert 528 becomes fully loaded with contaminants, the top cover 529 of the canister 526 is removed, and the filter insert 528 is pulled from the canister 526. As the filter insert 528 is pulled from the canister 526, hydraulic fluid from within the filter insert 528 drains back into the canister 526. As previously described, the provision of the wall 568 and the annular filter 578 ensures that contaminants are retained within the filter insert 528 during the drainage process. Thus, a new filter insert can be placed in the canister 526 without being contaminated by the hydraulic fluid already contained within the canister 526.

With regard to the foregoing description, it is to be understood that changes may be made in detail, especially in matters of the construction materials employed and the shape, size and arrangement of the parts without departing from the scope of the present invention. It is intended that the specification and depicted embodiments be considered illustrative only, with a true scope and spirit of the invention being indicated by the broad meaning of the following claims.

We claim:
1. A filter apparatus comprising:
   a) a first filter element aligned along a longitudinal axis that extends between top and bottom ends of the first filter element, the first filter element including an inner side that faces toward the longitudinal axis and defines a central opening that extends along the longitudinal axis, and the first filter element also including an outer side that faces away from the longitudinal axis;
   b) an insert body connected to the first filter element, the insert body including:
      i) a top end cap in which the top end of the first filter element is mounted;
      ii) a bottom end cap in which the bottom end of the first filter element is mounted;
      iii) an outer wall that surrounds the first filter element, the outer wall defining a contaminant containment chamber between the outer wall and the first filter element, the outer wall being impervious and being connected to the bottom end cap;
   c) the bottom end cap defining at least one drain opening located between the outer side of the first filter element and the outer wall for draining the contaminant containment chamber; and
   d) a second filter element positioned at the drain opening to filter fluid that drains from the drain opening such that contaminants are retained in the contaminant containment chamber.

2. The filter apparatus of claim 1, wherein the insert body, the first filter element and the second filter element together form a filter insert, and the filter apparatus further comprises an outer housing defining an inner cavity sized for removably receiving the filter insert.

3. The filter apparatus of claim 2, wherein the outer wall is sized and shaped to line an interior of the outer housing.

4. The filter apparatus of claim 2, further comprising a seal for inhibiting unfiltered liquid from flowing between the outer housing and the outer wall of the filter insert.

5. The filter apparatus of claim 4, wherein the seal comprises an O-ring.

6. The filter apparatus of claim 2, wherein the outer housing comprises an open-topped bowl having threads arranged and configured for allowing the bowl to be threaded onto a filter head.

7. The filter apparatus of claim 2, wherein the outer housing comprises a canister having a top that can be removed to insert the filter insert into the canister.

8. The filter apparatus of claim 2, wherein the outer housing is made of metal, and the insert body is made of a non-metal material.

9. The filter apparatus of claim 8, wherein the non-metal material comprises plastic.

10. The filter apparatus of claim 1, wherein the second filter element is secured to the bottom end cap.

11. The filter apparatus of claim 1, wherein the second filter element is mounted within the contaminant containment chamber.

12. The filter apparatus of claim 1, wherein the outer wall has a height that extends from the bottom end cap to the top end cap.

13. The filter apparatus of claim 1, wherein the outer wall is integrally formed with the bottom end cap.

14. A filter insert comprising:
   a) a first filter element aligned along a longitudinal axis that extends between top and bottom ends of the first filter element, the first filter element including an inner side that faces toward the longitudinal axis and defines a central opening that extends along the longitudinal axis, and the first filter element also including an outer side that faces away from the longitudinal axis; and
   b) an insert body connected to the first filter element, the insert body including:
      i) a top end cap in which the top end of the first filter element is sealed and secured;
      ii) a bottom end cap in which the bottom end of the first filter element is sealed and secured; and
      iii) an impervious outer wall that surrounds the first filter element, the outer wall being spaced-apart from the outer side of the first filter element such that a contaminant containment chamber is defined between the outer wall and the first filter element;
      iv) an inlet for allowing fluid to enter the contaminant containment chamber;
      v) the bottom end cap defining at least one drain opening for draining fluid from the containment chamber, the drain opening being located outside the first filter element and inside the outer wall, and the drain opening being separate from the inlet; and
      vi) a second filter positioned at the drain opening for filtering fluid that is drained from the containment chamber.

\* \* \* \* \*